United States Patent
Huh et al.

(10) Patent No.: US 7,570,968 B2
(45) Date of Patent: Aug. 4, 2009

(54) METHOD AND APPARATUS FOR ADAPTIVE OPEN-LOOP POWER CONTROL IN MOBILE COMMUNICATION SYSTEM USING TDD

(75) Inventors: Hoon Huh, Seongnam-si (KR);
Jae-Weon Cho, Suwon-si (KR);
Sie-Joon Cho, Seongnam-si (KR);
Soon-Young Yoon, Seongnam-si (KR);
Jin-Weon Chang, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 588 days.

(21) Appl. No.: 11/025,767

(22) Filed: Dec. 27, 2004

(65) Prior Publication Data

US 2005/0143121 A1 Jun. 30, 2005

(30) Foreign Application Priority Data

Dec. 29, 2003 (KR) ............... 10-2003-0099100
Feb. 2, 2004 (KR) ............... 10-2004-0006779

(51) Int. Cl.
*H04B 7/00* (2006.01)

(52) U.S. Cl. ............... 455/522; 455/69; 455/67.13; 455/63.1; 370/280

(58) Field of Classification Search ............... 455/522, 455/69, 24, 504, 562.1, 437, 436, 439, 440, 455/441, 442, 509, 525, 70, 13.4, 67.1, 67.13, 455/63.1; 375/240.27; 714/48, 780; 370/349, 370/342, 252, 331, 332, 335, 347, 280
See application file for complete search history.

(56) References Cited

U.S. PATENT DOCUMENTS 6,597,723 B1 * 7/2003 Zeira et al. ............... 375/130

(Continued)

FOREIGN PATENT DOCUMENTS

EP 0 668 664 1/1995

(Continued)

OTHER PUBLICATIONS

3$^{rd}$ Generation Partnership Project; Technical Specification Group Radio Access Network; Radio Resource Control (RRC) Protocol Specification, Release 1999.

(Continued)

*Primary Examiner*—Tan Trinh
(74) *Attorney, Agent, or Firm*—The Farrell Law Firm, LLP

(57) ABSTRACT

Disclosed is an apparatus for determining transmit power of an uplink frame transmitted from a subscriber station to a base station and transmitting data in a mobile communication system in which a downlink frame, transmitted from the base station to the subscriber station, and the uplink frame are time division-duplexed (TDD). The apparatus includes a receive power measurement unit for measuring receive power of signals received from the base station; a transmit power controller for determining the transmit power of the uplink frame from the receive power measured by the receive power measurement unit and information related to receptions of an uplink frame, which is received from the base station; and a transmission radio frequency processor for performing radio processing so that the uplink frame is transmitted according to the transmit power determined by the transmit power controller.

30 Claims, 11 Drawing Sheets

U.S. PATENT DOCUMENTS

| | | | |
|---|---|---|---|
| 6,600,772 | B1 | 7/2003 | Zeira et al. |
| 6,603,971 | B1* | 8/2003 | Mohebbi .................... 455/437 |
| 6,606,341 | B1* | 8/2003 | Kanterakis et al. .......... 375/130 |
| 2002/0114291 | A1* | 8/2002 | Moulsey et al. ............. 370/328 |
| 2002/0196766 | A1 | 12/2002 | Hwang et al. |
| 2003/0026324 | A1 | 2/2003 | Li et al. |
| 2003/0228876 | A1 | 12/2003 | Hwang |
| 2004/0004954 | A1* | 1/2004 | Terry et al. ................. 370/349 |
| 2006/0046767 | A1* | 3/2006 | Hunzinger .................. 455/522 |
| 2006/0286997 | A1* | 12/2006 | Seki et al. .................... 455/525 |
| 2008/0130527 | A1* | 6/2008 | Huh et al. .................... 370/280 |

FOREIGN PATENT DOCUMENTS

| | | |
|---|---|---|
| EP | 1 250 020 | 10/2002 |
| JP | 10-065612 | 3/1998 |
| RU | 2107393 | 3/1998 |
| WO | WO 03/105370 | 12/2003 |

OTHER PUBLICATIONS

Uplink Common Packet Channel, 3GPP-TSG Ran WG1#3, 1999.
Kourosh Parsa, An Overview of Common Packet Channel (CPCH), an Optimum Wireless Internet Mechanism in 3GPP W-CDMA System and Comparison of Various UMTS Non Real Time Data Deployment Options, 2000.

* cited by examiner

METHOD AND APPARATUS FOR ADAPTIVE OPEN-LOOP POWER CONTROL IN MOBILE COMMUNICATION SYSTEM USING TDD

PRIORITY

This application claims priority to an application entitled "Method and Apparatus for Adaptive Open-loop Power Control in Mobile Communication System Using TDD" filed in the Korean Intellectual Property Office on Dec. 29, 2003 and assigned Serial No. 2003-99100 and on Feb. 2, 2004 and assigned Serial No. 2004-6779, the contents of which are incorporated herein by reference.

BACKGROUND OF THE INVENTION

1. Field of the Invention

The present invention relates to a power control method for a mobile communication system, and more particularly to an apparatus and a method for controlling power by means of an open-loop scheme in a mobile communication system using a Time Division Duplex (TDD) scheme.

2. Description of the Related Art

From the end of the 1970's, at which time a cellular type wireless mobile communication system was developed in United States, a voice communication service has been provided to users through an Advanced Mobile Phone Service (AMPS) system, which has been referred to as a $1^{st}$ generation (1G) analog type mobile communication system. Then, in the middle of the 1990's, a Code Division Multiple Access (CDMA) system has been commercialized, and is commonly referred to as a $2^{nd}$ generation (2G) mobile communication system, so that a voice service and a low speed data service have been provided.

In addition, an International Mobile Telecommunication-2000 (IMT-2000), which is commonly referred to as a $3^{rd}$ generation (3G) mobile communication system, was proposed at the end of the 1990's for the purpose of providing an improved wireless multimedia service, a worldwide roaming service and a high-speed data service. Recently, the IMT-2000 services have been partially provided to users. In particular, the 3G mobile communication system has been developed to transmit higher speed data to handle the rapid increase of the amount of data provided from a mobile communication system. The 3G mobile communication system has been developed into a packet service communication system. The packet service communication system is a system for transmitting burst packet data to a plurality of mobile stations and is well suited for the transmission of mass storage data. The packet service communication system is being developed for high speed packet services.

Currently, the 3G mobile communication system is being developed into a $4^{th}$ generation (4G) mobile communication system. Apart from the previous mobile communication systems that provide only wireless communication services, the 4G mobile communication system is being standardized for the purpose of providing integrated wired/wireless communication services through an effective combination of a wireless communication network and a wire communication network. Accordingly, it is necessary to develop technology capable of transmitting mass storage data at levels compatible to the capacity of a wire communication network in a wireless communication network.

Hereinafter, the network construction of the mobile communication system as described above will be described with reference to FIG. 1.

FIG. 1 is a block diagram showing the network construction of a mobile communication system according to the prior art.

Referring to FIG. 1, a general 3G mobile communication system includes a Core Network (CN) 101, a base station controller 103, a plurality of base stations 105, and a plurality of subscriber stations (SSs) 107.

The CN 101 is connected to the base station controllers 103 by wire and each of the base station controllers 103 is connected to the base stations 105 by wire. Further, each of the base stations 105 transmits/receives through a wireless link data to/from one or more subscriber stations 107, which belong to an area controlled by the base station 105.

The CN 101 plays an independent role in a wireless access technology and controls position management, identification, call connection, etc., of the subscriber stations 107. The base station controller 103 controls radio resources to be assigned to the base station 105 connected to the base station controller 103. That is, the base station 105 transmits common broadcast signals to plural subscriber stations through downlink channels, which exist in a cell controlled by the base station 105, and transmits a specific signaling or user traffic to each of the subscriber stations. Further, the base station 105 receives and processes signaling transmitted from the subscriber station through an uplink channel. When a call setup has been accomplished, the base station 105 receives signals transmitted from each subscriber station.

Herein, an uplink channel and a downlink channel exchanged on a wireless link between the base station 105 and the subscriber station 107 may be transmitted/received through a TDD scheme or a Frequency Division Duplex (FDD) scheme.

The TDD scheme is a duplex scheme. That is, the duplex is a scheme for differentiating an uplink from a downlink between a subscriber station and a base station. The duplex scheme may be classified into an FDD scheme and a TDD scheme as described above. In the FDD scheme, an uplink is differentiated from a downlink by different frequencies and transmission antennas/reception antennas must independently exist in a subscriber station and a base station.

Different from the FDD scheme, in the TDD scheme, one antenna performs a transmission function and a reception function. In the TDD scheme, an uplink and a downlink exist as signals of the same frequency band. In order to differentiate the uplink from the downlink, which occupy the same frequency band in the TDD scheme as described above, an uplink signal and a downlink signal must be time-divided. That is, a time slot that includes the uplink signal and a time slot that includes the downlink signal are defined in advance, so that the uplink signal and the downlink signal can be communicated only during each time slot. In addition, the TDD scheme has increased circuit complexity as compared with the FDD scheme. However, the TDD scheme has high efficiency in use of frequencies. The construction of frames in a mobile communication system using the TDD scheme as described above will now be described.

FIG. 2 is a block diagram showing the construction of an uplink/downlink frame in the mobile communication system using the TDD scheme according to the prior art.

Referring to FIG. 2, in the TDD scheme, downlink frames 201 and 205 and an uplink frame 203 are time-divided in the same frequency band and then alternately and repeatedly transmitted. That is, the downlink frame 201 is transmitted and then the uplink frame 203 is transmitted after a predetermined transmission gap 213 passes. Similarly, the uplink frame 203 is transmitted and then the downlink frame 205 is transmitted after a predetermined transmission gap 219 passes.

The transmission gaps 213 and 219 assigned between the downlink and the uplink are gaps in which there are no signals and gaps established to prevent interference between signals which may occur due to sharing of the same frequency band by the uplink and the downlink.

A broadcasting channel 207 exists in the first portion of the downlink frame 201. The broadcasting channel 207 is a channel for transmitting system information used in controlling radio resources of a subscriber station. Downlink-bursts (DL-bursts) 209 and 211 for different subscriber stations sequentially exist after the broadcasting channel 207. Each subscriber station must receive downlink data during a time slot assigned for a channel of the subscriber station itself (i.e., during a corresponding downlink burst interval). Similarly, the uplink frame 203 includes a plurality of uplink-bursts (UL-bursts) 215 and 217 and each subscriber station must transmit uplink data during a time slot, that is, a corresponding uplink burst interval, which is assigned as the channel of the subscriber station.

In order to obtain the increase of communication capacity, high quality communication, etc., a general mobile communication system uses a downlink (direction from a base station to a subscriber station) power control and an uplink (direction from a subscriber station to a base station) power control. When the originated signal of a subscriber station is received by a base station with a signal-to-interference ratio (SIR) at a minimum required communication quality level, based on the transmit power control for all subscriber stations, a system capacity can be maximized. If the very strong signal of a subscriber station is received in a base station, the performance of the subscriber station is improved. However, this may cause an increase in the interference for another subscriber stations using the same channel. Therefore, the call quality of another subscriber station may be lowered below a predetermined level without the reduction of a maximum capacity.

A general CDMA communication system uses a forward (or downlink) open-loop power control method, a backward (or uplink) open-loop power control method and a backward closed-loop power control method as a method for the aforementioned power control. The forward power control is performed by a base station. That is, when a subscriber station is in an idle state or is relatively adjacent to a base station, has a small influence due to a multi-path fading and wave shadow, or experiences weak interference by another base station, the transmit power for a corresponding subscriber station is decreased. Additional power is provided to a subscriber station which is located in a bad reception area or in a position remote from a base station and thus has a high error rate.

The backward open-loop power control is performed by a subscriber station. The subscriber station measures power received from a base station, reflects downlink path loss and changes of a channel due to topography from the base station to the subscriber station in the magnitude of transmit power, and increases/decreases the magnitude of the transmit power, thereby compensating for the transmit power. In this way, transmission signals with the same intensities from all subscriber stations in a cell are received in a base station.

The backward closed-loop power control is a method by which subscriber stations control power at the command of a base station. The base station receives signals of relating subscriber stations, compares the signals with a predetermined target value, issues a power increase or decrease order to the subscriber stations with a predetermined time cycle, for example, every 1.25 ms. In this way, gain difference and different wave loss on a downlink and an uplink are compensated for.

In order to reduce the power consumption of a subscriber station and perform efficient communication, the aforementioned 3G mobile communication system and 4G mobile communication system use a power control method in which the systems control and transmit the transmit power of a base station or a subscriber station with a predetermined time cycle. Further, as described above, in the power control, a base station or a subscriber station adjusts the power $P_{Tx}$ of a transmission signal so that the Signal-to-Noise Ratio (SNR) of a signal $P_{Rx}$ arriving at a reception side maintains a predetermined target value.

Hereinafter, the open-loop power control method of the power control methods will be described in detail. In general, the TDD system uses the open-loop power control.

In such a case, a power determination method using an open-loop scheme is accomplished by compensating for power loss due to path loss. The path loss corresponds to a difference between the transmit power of a base station and the receive power of a subscriber station. That is, the subscriber station measures the power of received signals and the base station informs the subscriber station of the power of transmitted signals through a predetermined message. The subscriber station regards the difference between the two values as the path loss.

Hereinafter, a power control method in an asynchronous 3G mobile communication system, that is, a WCDMA system, will be described as one example of the power control method.

FIG. 3 is a flow diagram illustrating an open-loop power control method performed in a WCDMA-TDD mobile communication system according to the prior art.

First, a subscriber station receives a Primary Common Control Physical Channel (P-CCPCH) signal 301 or a downlink pilot signal at each frame from a base station, and measures the receive power $P_{PCCPCH,rx}$ of the P-CCPCH signal or the pilot signal (303). The physical layer of the subscriber station transmits to a Radio Resource Control (RRC) layer which is an upper layer (305) a System Information Block (SIB) including information on a system received from the base station.

A Radio Bearer (RB) setup is accomplished (307) between the subscriber station and the base station before a call setup is accomplished. The subscriber station reads a target SIR ($SIR_{target}$), interference power ($I_{BTS}$) measured in the base station, the transmission output value ($P_{PCCPCH,tx}$) of a P-CCPCH and a power compensation value ($DPCH_{const}$) from an RRC RB Setup message received from the base station, and then initializes the physical layer through the values (309).

When the call setup is completed by the method as described above, the subscriber station transmits a first uplink frame, which is an initially transmitted uplink frame, at a power level calculated by a predetermined scheme (311). Herein, the transmit power of the first uplink frame is determined by the open-loop power control method and a method of determining the value of the transmit power is expressed in Equation 1.

$$P_{DPCH} = \alpha L_{PCCPCH} + (1-\alpha)L_0 + I_{BTS} + SIR_{target} + DPCH_{const} \quad (1)$$

In Equation 1, $P_{DPCH}$ denotes the transmit power of the subscriber station and $L_{PCCPCH}$ denotes path loss experienced by the P-CCPCH signal. The path loss $L_{PCCPCH}$ may be calculated as a difference between a transmit power value in the base station and a receive power value in the subscriber station for the P-CCPCH. Further, the path loss $L_{PCCPCH}$ may be expressed by Equation 2.

$$L_{PCCPCH} = P_{PCCPCH,tx} - P_{PCCPCH,rx} \qquad (2)$$

In Equation 2, the $P_{PCCPCH,tx}$, which is the transmit power value in the base station for the P-CCPCH, is transmitted from the base station to the subscriber station through a predetermined message. The $P_{PCCPCH,rx}$, which is the receive power value in the subscriber station for the P-CCPCH, is obtained by measuring the receive power of the P-CCPCH signal received in the subscriber station.

Further, $L_0$ in Equation 1 is a long time average value obtained by calculating an average during a predetermined time for the path loss $L_{PCCPCH}$. Referring to Equation 1, the total path loss L is defined as a weighted average of the $L_{PCCPCH}$ and the $L_0$. That is, the path loss is the first and the second term in Equation 1 and may be expressed by Equation 3.

$$\text{path loss} = \alpha L_{PCCPCH} + (1-\alpha) L_0 \qquad (3)$$

In Equation 3, the α value is a value set for assigning a weighted value. If a time interval between an uplink and a downlink is small, the channel variation is small. Accordingly, it is preferred to set a large α value in order to increase the portion of the $L_{PCCPCH}$. In contrast, if the time interval between the uplink and the downlink is large, the channel variation is large. Accordingly, it is preferred to set a small α value in order to increase the portion of the $L_0$.

In Equation 1, $I_{BTS}$ is an interference power value measured by the base station. In the case of a general WCDMA system, since uplink signals of all subscriber stations experience the same interference according to each time slot, the $I_{BTS}$ is commonly applied to all subscriber stations according to each time slot. Further, the $I_{BTS}$ may be periodically transmitted through a broadcast channel.

The $SIR_{target}$ is a target value of an SIR which each subscriber station must obtain and is transmitted through a predetermined message before a dedicated physical channel is generated as described above. When it is necessary to renew the $SIR_{target}$ even after the dedicated physical channel has been generated, the $SIR_{target}$ is transmitted to a subscriber station through a predetermined message.

The $DPCH_{const}$ is a power compensation value for fine power control in an open-loop power control. The conventional mobile communication system using an open-loop scheme uses the $DPCH_{const}$ value as a constant value.

In relation to the 4G mobile communication system, an Orthogonal Frequency Division Multiplexing (OFDM)/Orthogonal Frequency Division Multiple Access (OFDMA) scheme has been recently proposed. The power control as described above is a problem even in a system using the OFDM/OFDMA scheme.

The OFDM/OFDMA scheme is a scheme used in an IEEE 802.16 based system and a scheme of converting serial modulation symbols to parallel data and transmitting the parallel data. Further, the OFDM/OFDMA scheme is a multiple access scheme, uses a Time Division Multiple Access (TDMA) scheme, and uses a TDD scheme as a duplex scheme. In the case of the OFDM scheme, 256 modulation symbols are generally subjected to a Fast Fourier Transform (FFT), so that one OFDM symbol is formed. In the case of the OFDMA scheme, one OFDM symbol is formed using a much greater number of modulation symbols. Further, in the OFDMA scheme proposed in the IEEE 802.16, a subchannel is formed from subcarriers constituting one OFDM symbol and plural OFDM symbols constitute one frame. Hereinafter, the OFDMA system as described above will be described.

FIG. 4 is a diagram showing the construction of an uplink/downlink frame in the conventional 802.16 OFDMA system.

Referring to FIG. 4, each frame includes a plurality of bursts marked by quadrangles in a time-frequency plane. Each of the bursts are multiple-accessed between subscriber stations and a base station through a TDMA scheme. Further, the uplink frame and the downlink frame are duplexed through a TDD scheme and Transmission Gaps (TGs) referred to as a Transmit/Receive Transition Gap (TTG) and a Receive/Transmit Transition Gap (RTG) are provided between the uplink frame and the downlink frame.

Each subscriber station performs an initial ranging and a periodic ranging in order to correct time and frequency errors of each burst in the uplink frame and adjust power. When the subscriber station attempts the ranging process, the base station measures the signal power of the subscriber station and informs the subscriber station of a compensation value for signal power loss due to path loss and rapid change of the signal power through a message of a Medium Access Control (MAC) layer.

SUMMARY OF THE INVENTION

The conventional open-loop power control method used in the aforementioned WCDMA/TDD system or 802.16 OFDM/OFDMA system has the following problems.

First, since the power compensation value of a dedicated physical channel changes according to the movement speed of a subscriber station, a measurement error of the receive power, etc., the $DPCH_{const}$ must be differently applied according to each subscriber station. However, in the prior art, a setting method of the $DPCH_{const}$ has not been described in detail and the movement speed of the subscriber station, the measurement error of the receive power, etc., are not taken into consideration, so that effective power control cannot be performed.

Second, when a general system employing the TDD scheme uses uplink reception diversity antennas, one antenna is used for both the transmission/reception and another antenna is used only for the reception. Consequently, according to the conventional power control method, it is impossible to consider antenna path loss for the dedicated reception antenna.

Third, in the aforementioned OFDM system in relation to the physical layer of the 4G mobile communication system, the target SNR $SNR_{target}$ attained by a Modulation and Coding Scheme (MCS) changes according to the frequency selectivity of a channel and the distribution of the interference on a frequency axis. Therefore, it is necessary to adjust the power compensation value, that is, $DPCH_{const}$, according to the change of a channel and interference.

Fourth, the power compensation value is periodically renewed through a message from a base station controller. This may cause an encoding/decoding problem of the message and a signaling overhead problem between layers. Further, according to the prior art, a detailed method on how to renew the power compensation value has not yet been proposed.

Accordingly, the present invention has been made to solve at least the above-mentioned problems occurring in the prior art, and it is an object of the present invention to provide an efficient open-loop power control apparatus and method in a mobile communication system using a TDD scheme.

It is another object of the present invention to provide an apparatus and a method capable of finely controlling power through the use of the feedback of frame error information in controlling uplink power in a mobile communication system using a TDD scheme.

In accordance with one aspect of the present invention, there is provided an apparatus for determining transmit power of an uplink frame transmitted from a subscriber station to a base station and transmitting data in a mobile communication system in which a downlink frame, transmitted from the base station to the subscriber station, and the uplink frame are time division-duplexed(TDD). The apparatus comprises a receive power measurement unit for measuring receive power of signals received from the base station; a transmit power controller for determining the transmit power of the uplink frame from the receive power measured by the receive power measurement unit and information related to receptions of an uplink frame, which is received from the base station; and a transmission radio frequency processor for performing radio processing so that the uplink frame is transmitted according to the transmit power determined by the transmit power controller.

In accordance with another aspect of the present invention, there is provided a method for determining transmit power of an uplink frame transmitted from a subscriber station to a base station and transmitting data in a mobile communication system in which a downlink frame, transmitted from the base station to the subscriber station, and the uplink frame are time division-duplexed(TDD). The method comprises the steps of measuring receive power of signals received from the base station; and determining the transmit power of the uplink frame based on the measured receive power and information related to receptions of an uplink frame, which is received by the base station.

In accordance with further another aspect of the present invention, there is provided a method for determining transmit power of an uplink burst transmitted from a subscriber station to a base station and transmitting data in a mobile communication system in which a downlink burst, transmitted from the base station to the subscriber station, and the uplink burst are time division-duplexed(TDD). The method comprises the steps of measuring receive power of signals transmitted from the base station and determining the transmit power of the uplink burst based on the measured receive power and a compensation value(Offset$_{perAT}$) of the subscriber station based on information related to receptions of an uplink burst.

In accordance with still another aspect of the present invention, there is provided an apparatus for determining transmit power of an uplink burst transmitted from a subscriber station to a base station and transmitting data in a mobile communication system in which a downlink burst, transmitted from the base station to the subscriber station, and the uplink burst are time division-duplexed(TDD). The apparatus comprises a receive power measurement unit for measuring receive power of signals received from the base station; a transmit power controller for determining the transmit power of the uplink burst based on the receive power measured by the receive power measurement unit and a compensation value (Offset$_{perAT}$) of the subscriber station based on information related to receptions of an uplink burst.

In accordance with yet another aspect of the present invention, there is provided a base station apparatus for transmitting data in order to determine transmit power of an uplink frame transmitted from a subscriber station to a base station in a mobile communication system in which a downlink frame transmitted from the base station to the subscriber station and the uplink frame are time division-duplexed(TDD). The base station apparatus comprises an error detector for determining if an error has occurred in uplink frame received from the subscriber station and an upper layer processor for receiving information related to whether or not the error has occurred in an uplink frame from the error detector and generating an ACK/NACK message of an upper layer according to the information for transmitting data in order to determine transmit power of the uplink frame transmitted from the subscriber station to the base station.

In accordance with yet another aspect of the present invention, there is provided a method for transmitting data by a base station in order to determine transmit power of an uplink frame transmitted from a subscriber station to the base station in a mobile communication system in which a downlink frame transmitted from the base station to the subscriber station and the uplink frame are time division-duplexed (TDD). The method comprises the steps of determining if an error has occurred in uplink frame received from the subscriber station; transmitting information related to whether or not the error has occurred in an uplink frame to an upper layer; and generating an ACK/NACK message of the upper layer according to the information for transmitting data in order to determine transmit power of the uplink frame transmitted from the subscriber station to the base station.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
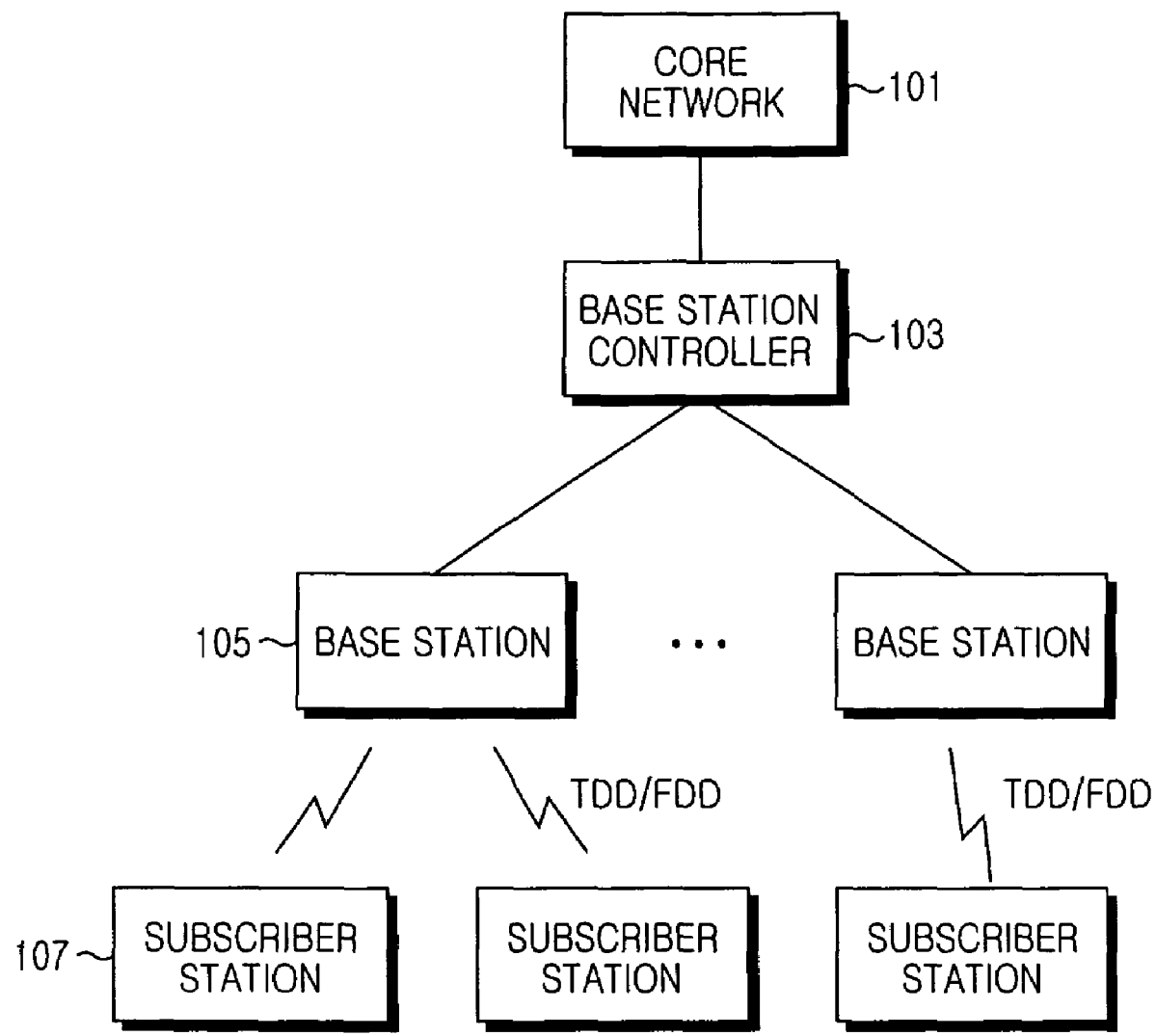
FIG. 1 is a block diagram showing the network construction of a mobile communication system according to the prior art.
Figure 2:
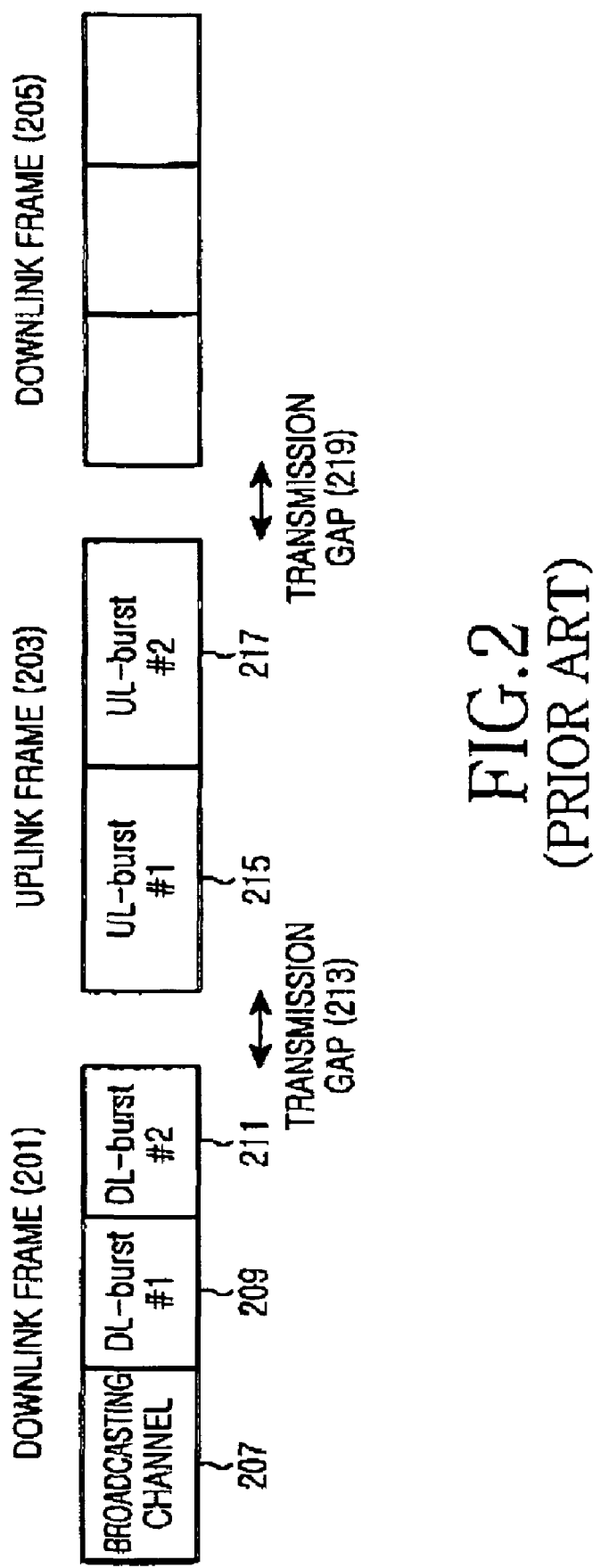
FIG. 2 is a block diagram showing the construction of an uplink/downlink frame in a mobile communication system using a TDD scheme according to the prior art.
Figure 3:
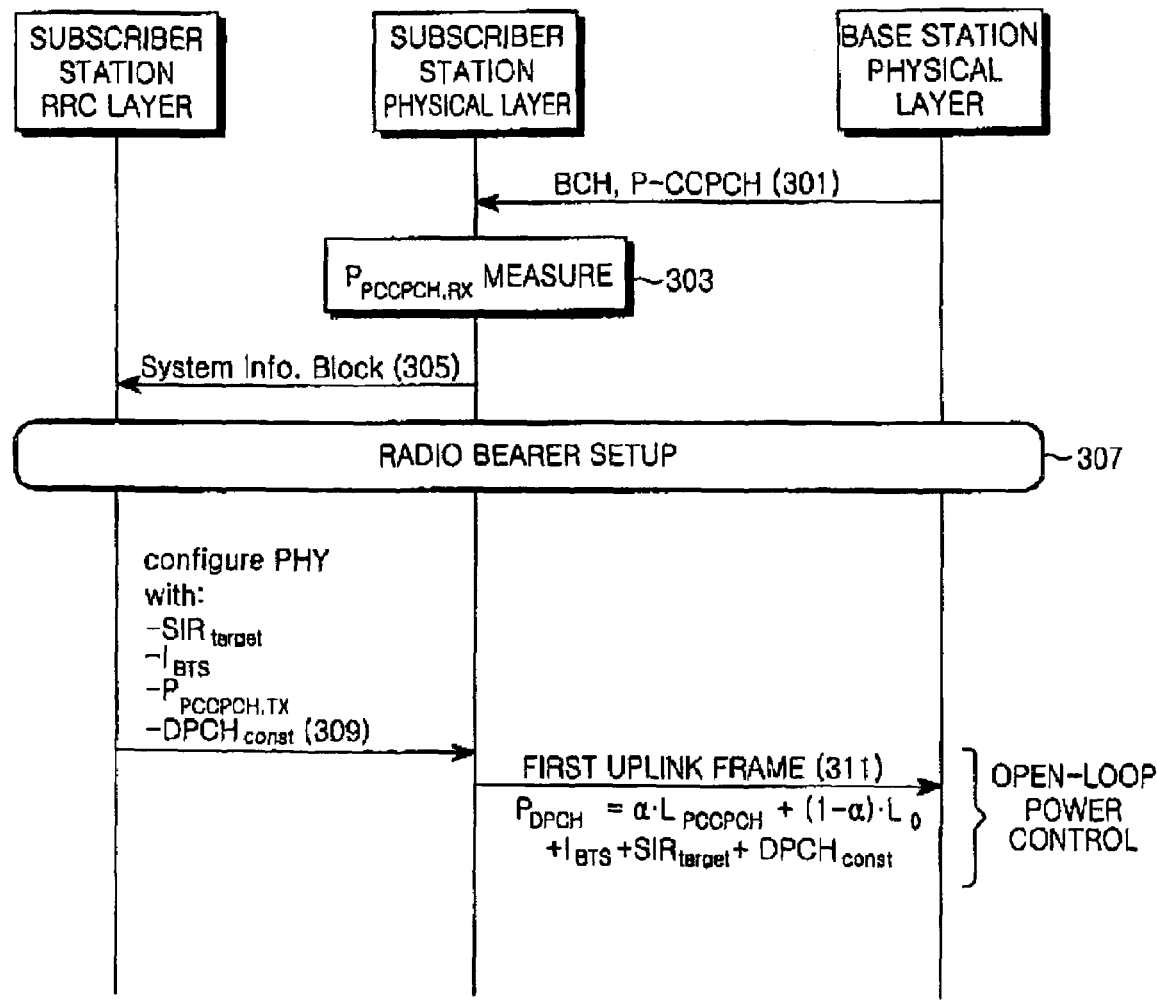
FIG. 3 is a flow diagram illustrating an open-loop power control method performed in a mobile communication system according to the prior art.
Figure 4:
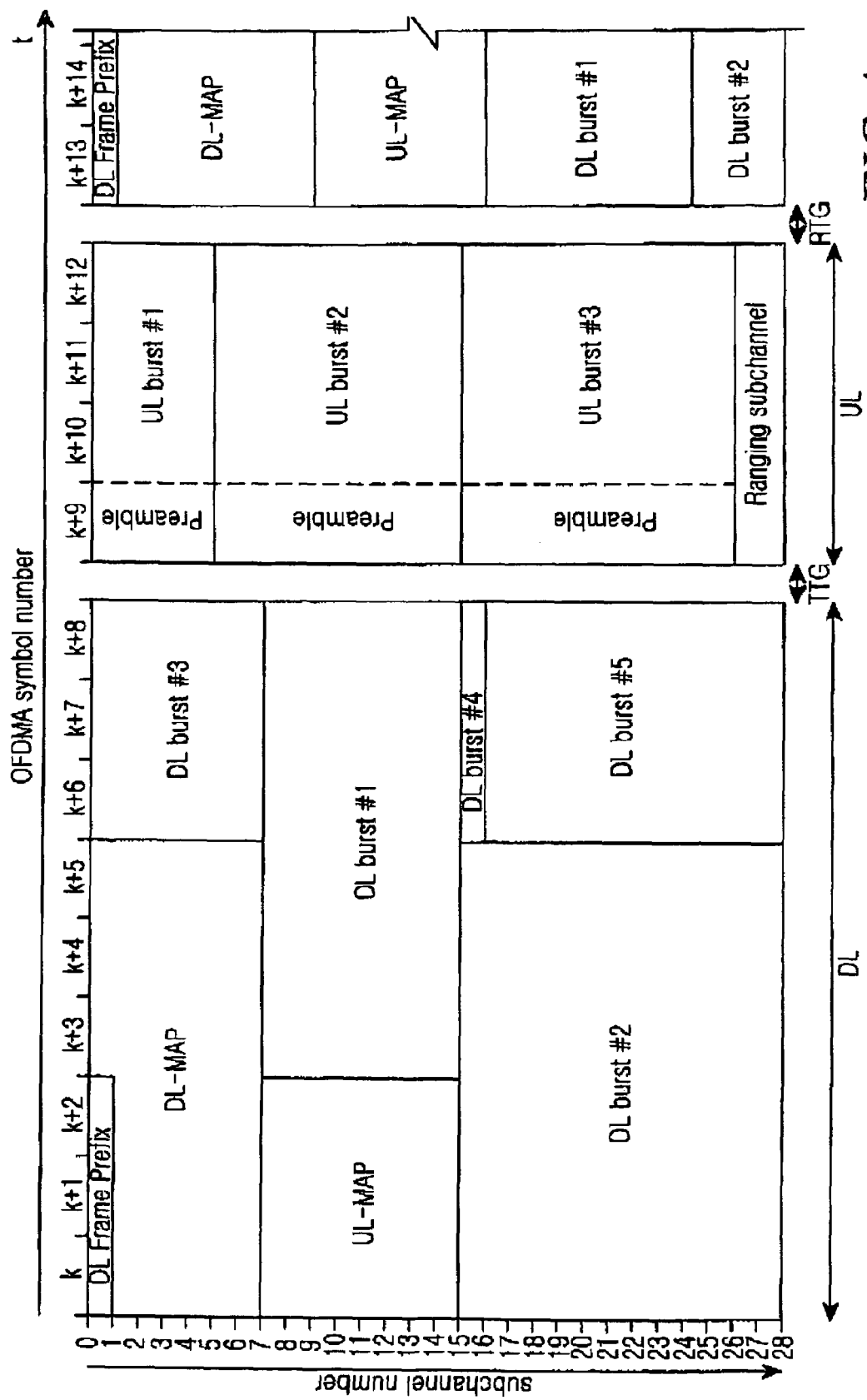
FIG. 4 is a diagram showing the construction of an uplink/downlink frame in the conventional 802.16 OFDMA system.

Hereinafter, a preferred embodiment according to the present invention will be described with reference to the accompanying drawings. In the following description of the present invention, a detailed description of known functions and configuration incorporated herein will be omitted when it may make the subject matter of the present invention unclear.

The present invention can be applied to any mobile communication system using a TDD scheme for duplexing an uplink and a downlink and transmitting the duplexed uplink and downlink. For example, it is apparent that the present invention can be applied to a WCDMA/TDD system, an NB-TDD system, an OFDM/OFDMA system, etc.

The present invention proposes a method for controlling power by means of an open-loop scheme in controlling the power of uplink signals transmitted from a subscriber station to a base station in a mobile communication system using a TDD scheme. Herein, information related to the existence or absence, that is, ACK/NACK message, of a frame error of the transmitted signal is received from the base station, so that the transmit power of the uplink signals can be controlled more exactly and finely through the received frame error information.

Further, the reception interference of a base station is measured according to each time slot used by a burst in each frame, so that the transmit power is exactly determined according to each subscriber station.

In a conventional TDD system using an open-loop scheme, a subscriber station cannot confirm the existence or absence of an error for reception data of a base station. Accordingly, it is difficult to achieve such an application as that in the present invention. However, a Fast ACK/NACK (A/N) channel is applied to currently proposed systems, so that a transmission side, that is, a subscriber station, can confirm the existence or absence of the error, thereby realizing the present invention.

Further, since the conventional systems do not employ a Hybrid Automatic Repeat Request (HARQ) scheme for uplink signals, a downlink A/N channel is not required. In contrast, in the present invention, the existence or absence of an error for a signal received in the base station is used in determining the transmit power of a subscriber station. Accordingly, it is necessary to provide predetermined A/N data or a predetermined A/N channel for feedbacking the existence or absence of the error for the signal received in the base station.

Further, an A/N signal proposed for the realization of the present invention may be transmitted through a dedicated channel of a physical layer. Otherwise, the A/N signal may also be transmitted by a message of an upper layer.

Hereinafter, an open-loop power control method for uplink transmit power proposed in the present invention will be first described.

The uplink transmit power proposed in the present invention may be expressed by Equation 4.

$$P_{UL,TX} = SIR_{target} + I_{AP} + \alpha PathLoss_{inst} + (1-\alpha) PathLoss_{avg} + Offset_{perAT} \quad (4)$$

Referring to Equation 4, the uplink transmit power $P_{UL,TX}$ is determined by a target SIR $SIR_{target}$, the power $I_{AP}$ of an interference signal measured by a base station, a downlink path loss $\alpha PathLoss_{inst} + (1-\alpha) PathLoss_{avg}$ and a power compensation value $Offset_{perAT}$ according to each subscriber station. According to Equation 4, the power compensation value $Offset_{perAT}$ according to each subscriber station is newly proposed as compared with Equation 1 which is an open-loop power control equation according to the prior art. According to the present invention, information related to whether or not a transmission signal has been normally received in a base station is fedback to each subscriber station and is then reflected in the power compensation value $Offset_{perAT}$, so that a more exact and precise power control can be performed. A detailed determination method of the power compensation value $Offset_{perAT}$ will be described later.

Further, in Equation 4, since the $PathLoss_{inst}$ and the $PathLoss_{avg}$ may be calculated as a difference between the transmit power of a base station and the receive power of a subscriber station, the $PathLoss_{inst}$ and the $PathLoss_{avg}$ may be expressed by Equation 5.

$$PathLoss_{inst} = P_{DL,TX} - P_{DL,RX,inst}$$

$$PathLoss_{avg} = P_{DL,TX} - P_{DL,RX,avg} \quad (5)$$

Accordingly, when Equation 5 is put into the third and the fourth term of Equation 4, the third and the fourth term of Equation 4 may be expressed as Equation 6.

$$\alpha PathLoss_{inst} + (1-\alpha) PathLoss_{avg} = P_{DL,TX} - \alpha P_{DL,RX,inst} - (1-\alpha) P_{DL,RX,avg} \quad (6)$$

Finally, when Equation 6 is put into Equation 4, Equation 4 may be expressed as Equation 7.

$$P_{UL,TX} = SIR_{target} + I_{AP} + P_{DL,TX} - \alpha P_{DL,RX,inst} - (1-\alpha) P_{DL,RX,avg} + Offset_{perAT} \quad (7)$$

Further, in Equation 7, the $I_{AP}$ value an the $P_{DL,TX}$ value are common values periodically transmitted by a base station and may be defined as one $Offset_{common}$ as expressed by Equation 8.

$$Offset_{common} = I_{AP} + P_{DL,TX} \quad (8)$$

Accordingly, when Equation 8 is put into Equation 7, the uplink transmit power $P_{UL,TX}$ according to the present invention may be finally expressed as Equation 9.

$$P_{UL,TX} = SIR_{target} - \alpha P_{DL,RX,inst} - (1-\alpha) P_{DL,RX,avg} + Offset_{common} + Offset_{perAT} \quad (9)$$

In Equation 9, the target SIR $SIR_{target}$ and the $Offset_{common}$ value including the power $I_{AP}$ of the interference signal measured by the base station and the transmit power of the base station $P_{DL,TX}$ are values received from the base station. The $P_{DL,RX,inst}$ value and the $P_{DL,RX,avg}$ value are values measured from a downlink signal received from the base station. Further, the $\alpha$ value is a weighted value as described above and is a value predetermined or periodically adjusted according to the situations of a system.

In the present invention, the uplink transmit power is determined according to Equation 9, information related to whether or not a signal transmitted from each subscriber station through an uplink has been normally received in a base station is fedback and is then reflected in the power compensation value $Offset_{perAT}$, so that a more effective and precise power control can be performed.

Further, in the present invention, the $Offset_{common}$ value can be variously set, so that a more precise and efficient power control can be performed for an uplink transmission signal.

First, a method for establishing the $Offset_{common}$ value in Equation 9 will be described. The $Offset_{common}$ value is obtained by adding the $I_{AP}$ to the $P_{DL,TX}$ as described in Equation 8. Herein, the $P_{DL,TX}$ is the downlink transmit power transmitted from a base station to a subscriber station and the base station transmits the $P_{DL,TX}$ to the subscriber station. Further, the $I_{AP}$ value, which is the power of an inference signal measured in the base station, may be determined by the following two methods.

The first method is a method for measuring the $I_{AP}$ by the frame. That is, $I_{AP}$ values measured in all burst intervals of an uplink frame are commonly applied to all subscriber stations. In such a case, the Offset$_{common}$ value is set as expressed by Equation 8 and is transmitted to all subscriber stations through a predetermined message.

The second method is a method for measuring the $I_{AP}$ by the time slot. The method is a method capable of being applied to a TDMA uplink. That is, the $I_{AP}$ is measured according to each time slot and the values corresponding to subscriber stations are differently set. In such a case, the $I_{AP}$ is measured according to each time slot, the Offset$_{common}$ values are determined by Equation 8, the Offset$_{common}$ values corresponding to each time slot are transmitted to subscriber stations through a predetermined common channel. Each of the subscriber stations determines the uplink transmit power according to Equation 9 by means of the corresponding Offset$_{common}$ value of the time slot.

Hereinafter, the two methods for determining the $I_{AP}$ will be described in detail with reference to FIG. 11.

Figure 11:
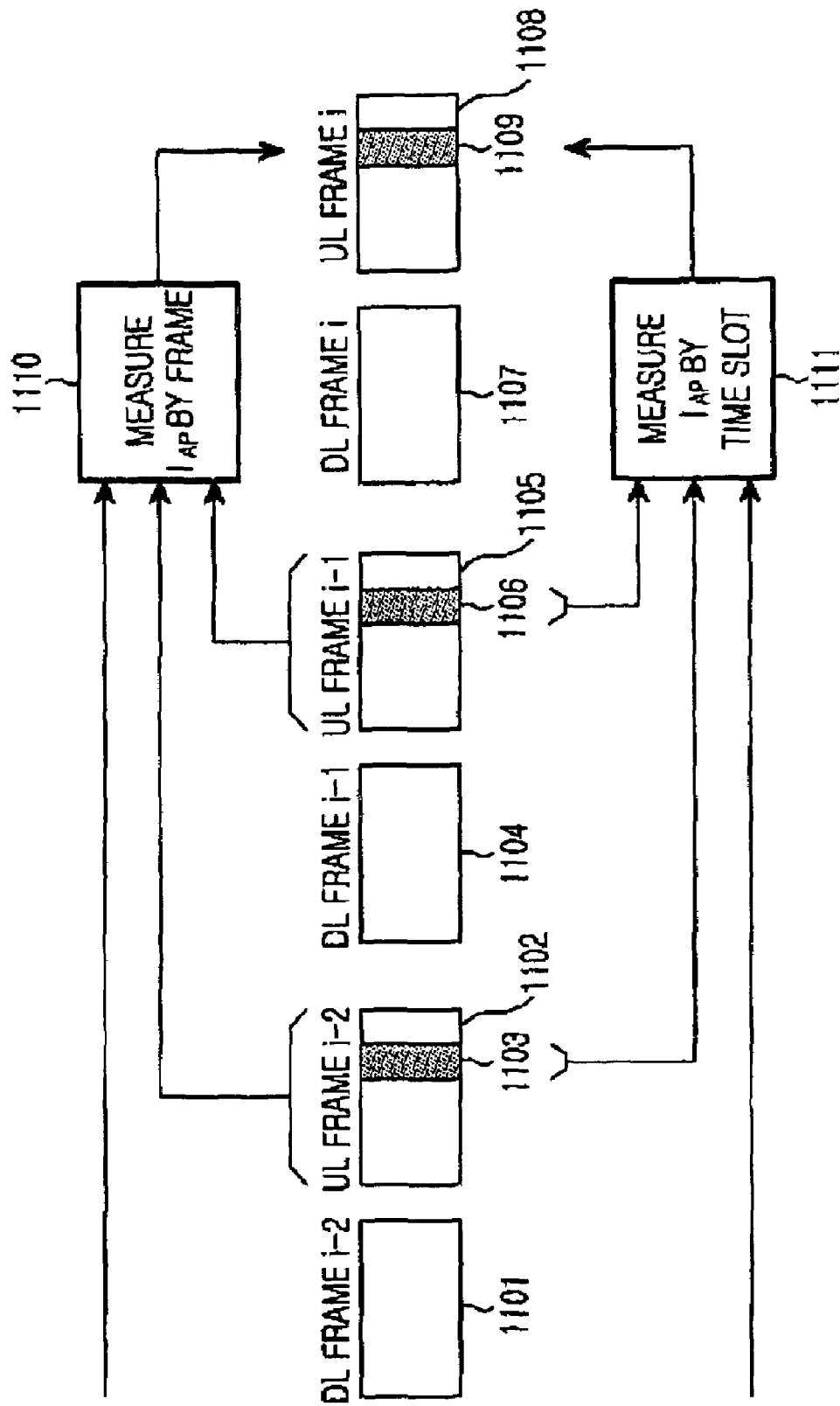
FIG. 11 is a diagram illustrating a receive interference power measurement method of a base station according to an embodiment of the present invention.

Referring to FIG. 11, in a TDD system in which a plurality of downlink frames 1101, 1104 and 1107 and uplink frames 1103, 1106 and 1109 are time-divided and transmitted, a measurement method of reception inference power $I_{AP}$ of a base station may be accomplished by the frame or the time slot as described above.

The base station measures the $I_{AP}$ in order to determine the transmit power in an $j^{th}$ time slot 1109 of an $i^{th}$ uplink frame 1108. When the base station measures the $I_{AP}$ by the frame, the base station measures the reception signals in all of the intervals of an $(i-1)^{th}$ uplink frame 1105 and determines (1110) an $I_{AP}$ to be reported to a subscriber station. Further, as the situation requires, the base station may measure reception signals even in all of the intervals of an $(i-2)^{th}$ uplink frame 1102 and an uplink frame prior to the $(i-2)^{th}$ uplink frame 1102, and also use the measured values in determining the $I_{AP}$. For example, an average value of $I_{AP}$ values of a predetermined number of previous frames may be obtained, or the $I_{AP}$ may be obtained after a weighted value is applied to each frame.

In contrast, when the base station measures the $I_{AP}$ by the time slot, the base station measures reception signals in an $j^{th}$ time slot 1106 of the $(i-1)^{th}$ uplink frame 1105 and determines (1111) an $I_{AP}$ to be reported to the subscriber station. Further, similar to the case of the measurement by the frame, as the situation requires, the base station may measure the reception signals even in an $j^{th}$ time slot 1103 of the $(i-2)^{th}$ uplink frame 1102 and an $j^{th}$ time slot of a frame prior to the $(i-2)^{th}$ uplink frame 1102, and also use the measured values in determining the $I_{AP}$.

In the communication system using the TDD scheme, a plurality of subscriber stations transmit/receive data by means of one or more time slots in a predetermined frame. Accordingly, when the base station measures the $I_{AP}$ by the time slot as described above, the $I_{AP}$ may be differently set in each subscriber station. Therefore, the transmit power can be more finely adjusted according to each subscriber station.

In the above description, the determination method of the Offset$_{common}$ value which is included in the uplink transmit power calculation of Equation 9 and identically or differentially assigned to subscriber stations by a base station has been described. Hereinafter, a determination method of the power compensation value Offset$_{per,AT}$ will be described.

First, an initial value Offset$_{initial}$ of the power compensation value Offset$_{per,AT}$ is transmitted from a base station to a subscriber station through a predetermined message. Then, the base station having received uplink signals receives signals transmitted from the subscriber station and inspects a packet error of the received signals. As a result of the inspection, when an error has occurred in the received packet, the base station feedbacks an NACK signal to the subscriber station. In contrast, when an error has not occurred in the received packet, the base station feedbacks an ACK signal to the subscriber station.

Herein, it is preferred that the subscriber station having received the NACK signal compensates for the transmit power by means of a power compensation value greater than the initial value in order to reduce a packet error in the next uplink transmission, and transmits the next uplink. In contrast, it is preferred that the subscriber station having received the ACK signal decreases the power compensation value by one step in the next uplink transmission, and transmits the next uplink. In this way, the power compensation value may be determined as expressed by Equation 11 by the received ACK or NACK signal.

Offset$_{perAT}$=Offset$_{perAT}$+UP_STEP if NACK is received $$Offset_{perAT} = Offset_{perAT} - \frac{1}{1/FER_{target} - 1} UP\_STEP$$

else if ACK is received, and

Offset$_{perAT}$=Offset$_{perAT}$ else where (11)

In Equation 11, the UP_STEP value is an increase of the Offset$_{perAT}$ and the FER$_{target}$ is a target value of a Frame Error Rate (FER).

Referring to Equation 11, the case of receiving the NACK signal from the base station represents that the base station has not normally received data transmitted from the subscriber station. Accordingly, it is preferred to increase the transmit power through an uplink. That is, when the subscriber station receives the NACK signal, it is necessary to increase the Offset$_{perAT}$ value by the UP_STEP value.

In contrast, the case of receiving the ACK signal from the base station represents that the base station has normally received the data transmitted from the subscriber station. Accordingly, it is preferred to decrease the transmit power through an uplink. That is, when the subscriber station receives the ACK signal, it is necessary to decrease the Offset$_{perAT}$ value by a predetermined value considering an FER. In other words, since the probability of receiving the NACK signal is less than that of receiving the ACK signal according to the FER, the decreasing value when receiving the ACK signal is less than the increasing value when receiving the NACK signal.

Hereinafter, a subscriber station and a base station transmission/reception apparatus and method to which the transmit power determination method is applied according to the aforementioned embodiment of the present invention will be described with reference to FIGS. 5 to 10.

First, the subscriber station transmission/reception apparatus and method according to the embodiment of the present invention will be described with reference to FIGS. 5 and 6.

Figure 5:
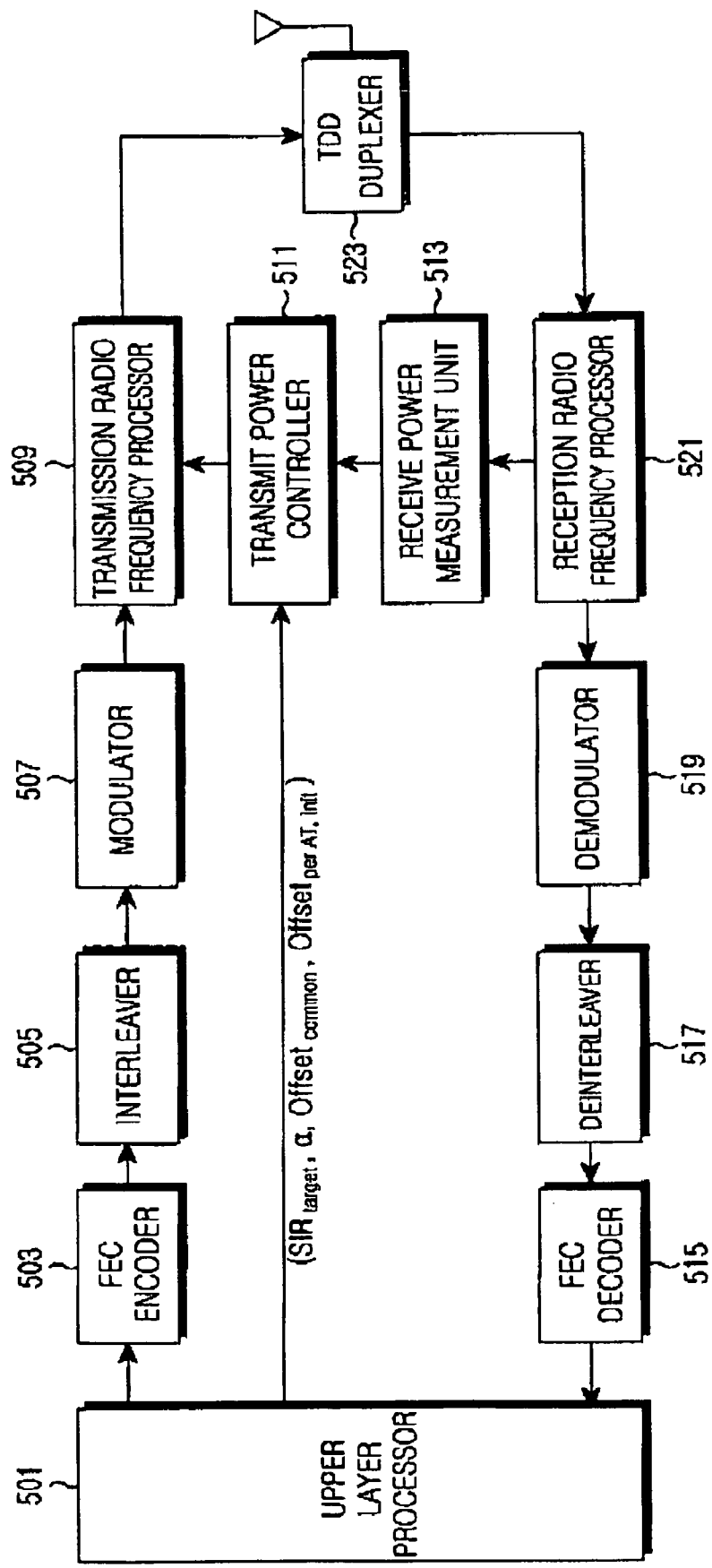
FIG. 5 is a block diagram showing a subscriber station transmission/reception apparatus for performing an adaptive open-loop power control according to an embodiment of the present invention.

FIG. 5 is a block diagram showing the subscriber station transmission/reception apparatus for performing an adaptive open-loop power control according to an embodiment of the present invention.

Referring to FIG. 5, signals transmitted/received from/in the subscriber station are time division-duplexed by a TDD duplexer 523. Further, the subscriber station apparatus includes a transmitter for processing data to be transmitted from an upper layer processor 501 to the TDD duplexer 523 and a receiver for processing data received from the TDD duplexer 523 to the upper layer processor 501.

First, predetermined transmission data generated by the upper layer processor 501 are encoded by a Forward Error Correction (FEC) encoder 503, interleaved by an interleaver 505, and modulated by a modulator 507. The signals modulated by the modulator 507 are subjected to radio signal processing by a transmission radio frequency processor 509 and are then transmitted through an uplink frame transmission interval in the TDD duplexer 523.

Further, signals received in the subscriber station through an antenna are received during a downlink frame transmission interval in the TDD duplexer 523 and are then subjected to a radio signal processing in a reception radio frequency processor 521. Then, the processed signals are demodulated by a demodulator 519, deinterleaved by an deinterleaver 517, decoded by an FEC decoder 515, and are then transmitted to the upper layer processor 501.

A transmit power controller 511 according to an embodiment of the present invention determines the transmit power by a method as described in Equation 9. Herein, parameters, that is, an $SIR_{target}$, a $\alpha$, an $Offset_{common}$ and an $Offset_{perAT,init}$, required for determining the transmit power are received from a base station. The parameters are transmitted from the upper layer processor 501 to the transmit power controller 511 and are then used in determining the transmit power. A receive signal power value $P_{DL,RX}$ used in determining the transmit power is measured by a receive power measurement unit 513 and the measured receive signal power value $P_{DL,RX}$ is transmitted to the transmit power controller 511. Furthermore, according to an embodiment of the present invention, the $Offset_{perAT}$ value is renewed by the ACK or NACK signal fedback from the base station as described above and is then used in determining the transmit power.

Accordingly, the transmit power controller 511 determines the transmit power according to the embodiment of the present invention and controls the transmit power of signals transmitted through the transmission radio frequency processor 509.

Figure 6:
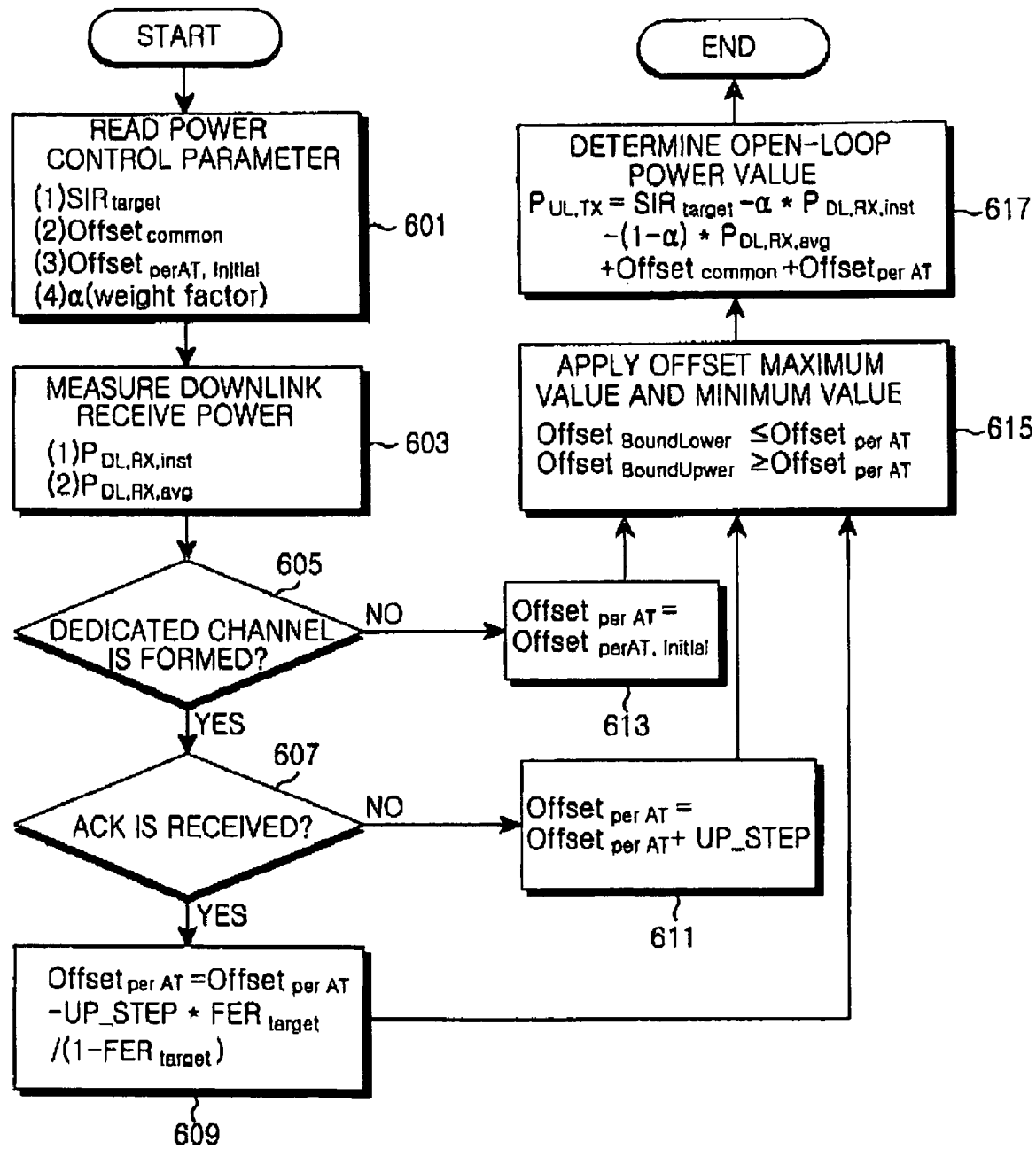
FIG. 6 is a flow diagram illustrating an adaptive open-loop power control method in a subscriber station according to an embodiment of the present invention.

FIG. 6 is a flow diagram illustrating the adaptive open-loop power control method in a subscriber station according to the embodiment of the present invention.

Referring to FIG. 6, the subscriber station reads the power control-related parameters received from a base station in order to determine the uplink transmit power according to an embodiment of the present invention (step 601). The power control-related parameters include the $SIR_{target}$, the $\alpha$, the $Offset_{common}$, the $Offset_{perAT,init}$, etc., as described above. Further, the subscriber station measures a downlink receive power value $P_{DL,RX,inst}$ required for determining the transmit power (step 603) and calculates an average value $P_{DL,RX,avg}$ of the receive power values.

If a transmission point in time for data by the subscriber station is a point in time at which a dedicated channel has not been formed between the subscriber station and the base station (step 605), the current $Offset_{perAT}$ value is established as an previous $Offset_{perAT}$ value (step 613). In contrast, if the transmission point in time for data by the subscriber station is a point in time at which the dedicated channel has been already formed between the subscriber station and the base station, the subscriber station determines the uplink transmit power by the transmit power determination method as expressed by Equation 9 according to the present invention.

Accordingly, if receiving an ACK signal from the base station (step 607), the subscriber station decreases the power compensation value $Offset_{perAT}$ by the predetermined value as expressed by Equation 11 (step 609). In contrast, if receiving an NACK signal from the base station, the subscriber station increases the power compensation value $Offset_{perAT}$ by the predetermined value UP_STEP as expressed by Equation 11 (step 611).

Then, the subscriber station employs an offset maximum value and an offset minimum value so that the power compensation value $Offset_{perAT}$ determined according to the above condition is set within a range between the permissible maximum value and minimum value (step 615). Next, the subscriber station finally determines an open-loop power value $P_{UL,TX}$ according to Equation 9 by means of the determined power compensation value $Offset_{perAT}$ (step 617).

In the above description, the transmission/reception apparatus and the transmit/receive power determination method of the subscriber station according to the embodiment of the present invention have been described. Hereinafter, embodiments regarding the transmission/reception apparatus and method of the base station will be described with reference to FIGS. 7 to 10.

A First Embodiment for a Base Station

Figure 7:
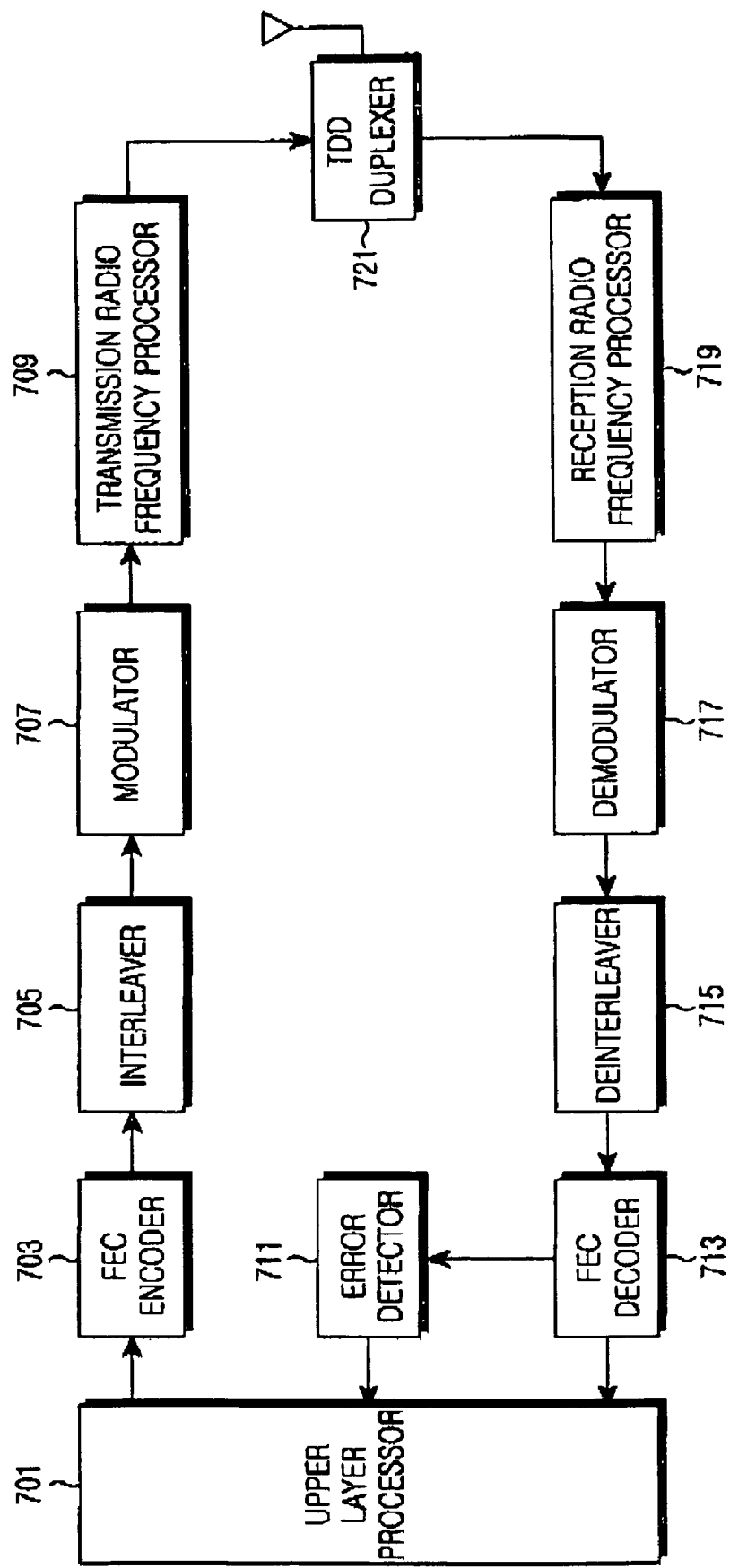
FIG. 7 is a block diagram showing a base station transmission/reception apparatus for performing an adaptive open-loop power control according to the first embodiment of the present invention.

FIG. 7 is a block diagram showing the base station transmission/reception apparatus for performing an adaptive open-loop power control according to a first embodiment of the present invention.

Referring to FIG. 7, signals transmitted/received from/in the base station are time division-duplexed by a TDD duplexer 721. Further, the base station apparatus includes a transmitter for performing a transmission processing for data to be transmitted from an upper layer processor 701 to the TDD duplexer 721 and a receiver for performing a reception processing for data received from the TDD duplexer 721 to the upper layer processor 701.

First, predetermined transmission data generated by the upper layer processor 701 are encoded by an FEC encoder 703, interleaved by an interleaver 705, and modulated by a modulator 707. The signals modulated by the modulator 707 are subjected to a radio signal processing by a transmission radio frequency processor 709 and are then transmitted through a downlink frame transmission interval in the TDD duplexer 721.

In the present invention, an ACK/NACK message is generated in the upper layer processor 701 based on whether or not an error has occurred in uplink data received from the subscriber station. The ACK/NACK message generated in the upper layer processor 701 is transmitted to the subscriber station through the aforementioned process.

Further, signals received from the subscriber station through an antenna are received during an uplink frame transmission interval in the TDD duplexer 721 and are then subjected to a radio signal processing in a reception radio frequency processor 719. Then, the processed signals are demodulated by a demodulator 717, deinterleaved by an deinterleaver 715, decoded by an FEC decoder 713, and are then transmitted to the upper layer processor 701.

Herein, for realization of the present invention, the data received in the base station are decoded by the FEC decoder 713, then, an error detector 711 determines if an error has occurred in the received data and information related to whether or not the error has occurred in the received data is transmitted to the upper layer processor 701. As described above, the upper layer processor 701 generates the ACK message or the NACK message according to the received information and transmits the generated ACK message or NACK message to a corresponding subscriber station through the transmitter.

The first embodiment of the present invention for the base station is characterized in that the base station transmits the ACK message or the NACK message to a message of an upper layer. Accordingly, as described above, the physical layer of the base station includes the error detector 711 for determining if an error has occurred in the received packet data. Further, the error detector reports the existence or the absence of the error to the base station upper layer processor 701 according to the existence or the absence of the error. The base station upper layer processor 701 generates the ACK message or the NACK message according to the reported result and transmits the generated ACK message or NACK message to the corresponding subscriber station.

When the base station is based on an OFDM system, the aforementioned modulator 707 and demodulator 717 are respectively constructed by an IFFT unit and an FFT unit. However, the scope of the present invention is not limited to the OFDM system as described above.

Figure 8:
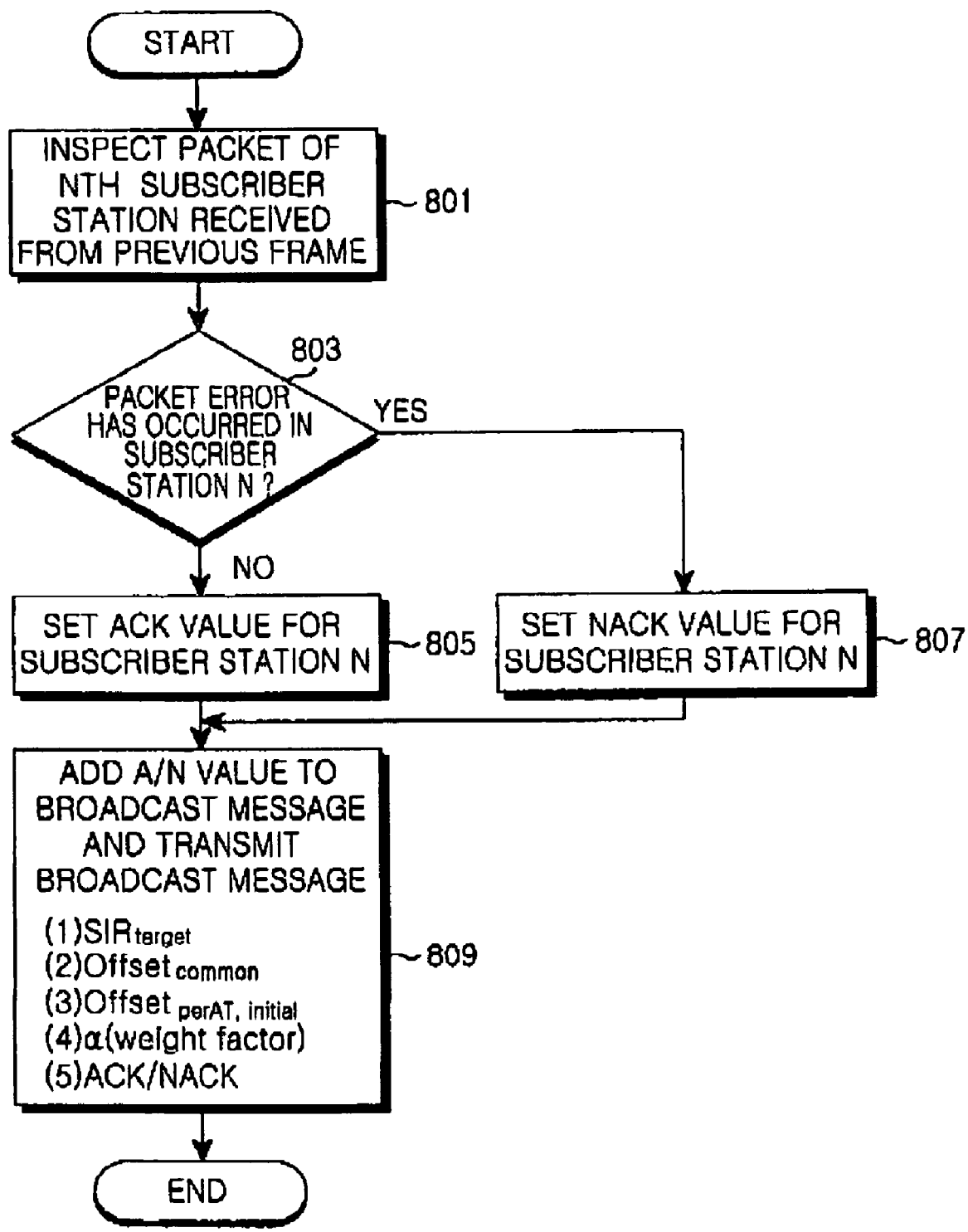
FIG. 8 is a flow diagram illustrating a performance method in a base station for an adaptive open-loop power control according to the first embodiment of the present invention.

FIG. 8 is a flow diagram illustrating a performance method in the base station for an adaptive open-loop power control according to the first embodiment of the present invention.

Referring to FIG. 8, the base station first inspects the packet of an $n^{th}$ subscriber station received from a previous frame (step 801). Then, the base station determines if an error has occurred in the received packet for the subscriber station n (step 803).

As a result of determination, when on error has occurred in the received packet, the base station set an NACK value for the subscriber station n (step 807). In contrast, when an error has not occurred in the received packet, the base station set an ACK value for the subscriber station n (step 805).

Further, when the ACK value or the NACK value is established, the base station adds the established ACK value or NACK value to a broadcast message and transmits the broadcast message (step 809). Herein, the broadcast message may be transmitted together with the aforementioned parameters, for example, an $SIR_{target}$, an $Offset_{common}$, an $Offset_{initial}$, a $\alpha$ (weight factor), required for an uplink power control.

A Second Embodiment for a Base Station

Figure 9:
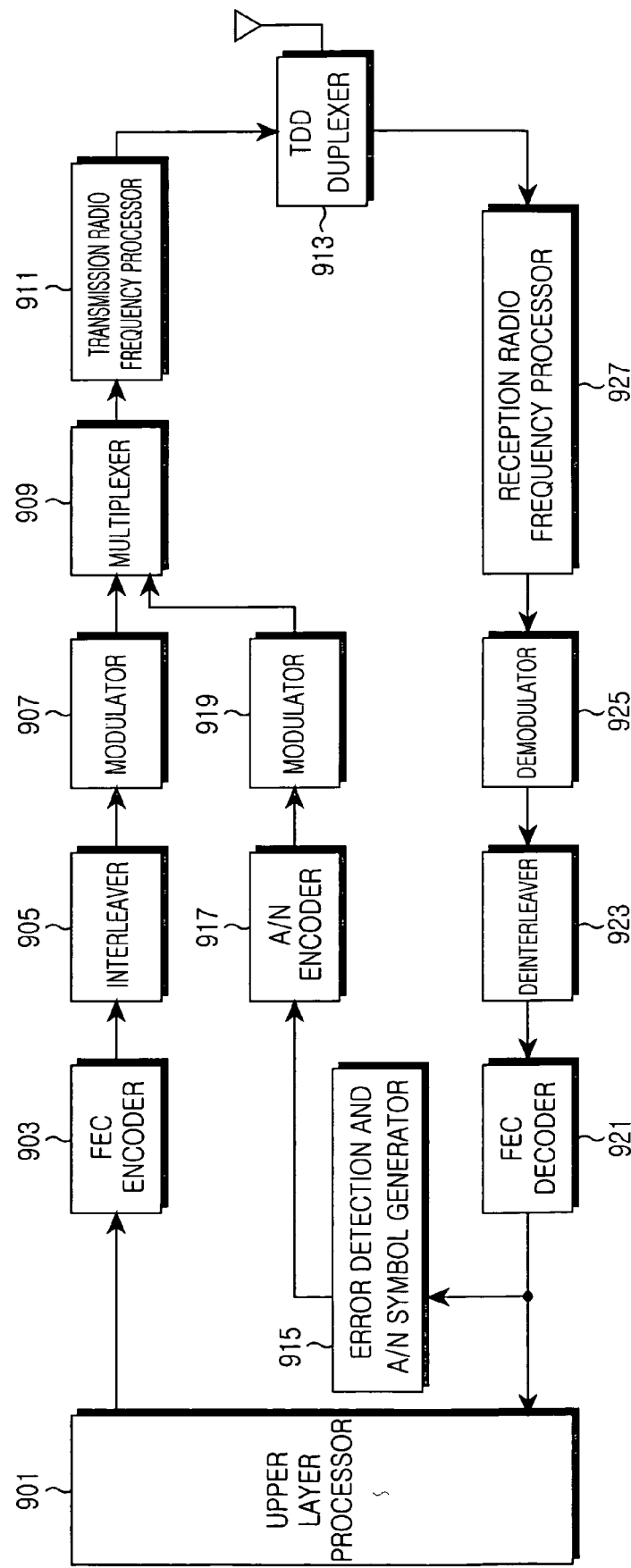
FIG. 9 is a block diagram showing a base station transmission/reception apparatus for performing an adaptive open-loop power control according to the second embodiment of the present invention.

FIG. 9 is a block diagram showing the base station transmission/reception apparatus for performing an adaptive open-loop power control according to a second embodiment of the present invention.

Referring to FIG. 9, signals transmitted/received from/in the base station are time division-duplexed by a TDD duplexer 913. Further, the base station apparatus includes a transmitter for processing data to be transmitted from an upper layer processor 901 to the TDD duplexer 913 and a receiver for performing a reception processing for data received from the TDD duplexer 913 to the upper layer processor 901.

First, predetermined transmission data generated by the upper layer processor 901 are encoded by an FEC encoder 903, interleaved by an interleaver 905, and modulated by a modulator 907. The signals modulated by the modulator 907 are multiplexed by a multiplexer 909, are subjected to a radio signal processing by a transmission radio frequency processor 911, and are then transmitted through a downlink frame transmission interval in the TDD duplexer 913.

In the present invention, an ACK/NACK message generated in a physical layer is transmitted through a dedicated control channel based on whether or not an error has occurred in uplink data received from the subscriber station. The dedicated control channel that includes the ACK/NACK message is multiplexed by the multiplexer 909 together with other downlink physical channels and is then transmitted to the subscriber station.

Further, signals received from the subscriber station through an antenna are received during an uplink frame transmission interval in the TDD duplexer 913 and are then subjected to a radio signal processing in a reception radio frequency processor 927. Then, the processed signals are demodulated by a demodulator 925, deinterleaved by an deinterleaver 923, decoded by an FEC decoder 921, and are then transmitted to the upper layer processor 901.

Herein, for realization of the present invention, data received in the base station are decoded by the FEC decoder 921. Then, an error detection and A/N symbol generator 915 detects if an error has occurred in the received data and generates an A/N symbol based on the result of the detection. The A/N symbol generated by the error detection and A/N symbol generator 915 is encoded by an A/N encoder 917 and is then modulated by a modulator 919.

The A/N symbol generated in the physical layer as described above is multiplexed together with other downlink physical channels and is then transmitted through the dedicated control channel according to the second embodiment of the present invention.

Accordingly, information related to whether or not the error has occurred in the received data is not transmitted to the upper layer processor 901, in contrast with the first embodiment. Instead, the ACK/NACK message is generated in the physical layer and is then transmitted to the subscriber station through a separate physical channel.

Further, according to the second embodiment of the present invention, the ACK/NACK message is transmitted through the dedicated channel of the physical layer, so that the feedback speed of information is faster than that of the method in the first embodiment. Therefore, it is possible to quickly adapt to changed channel conditions.

Similar to the case of the first embodiment, when the base station is based on an OFDM system, the aforementioned modulator 907 and demodulator 925 are respectively constructed by an IFFT unit and an FFT unit. However, the scope of the present invention is not limited to the OFDM system as described above.

Figure 10:
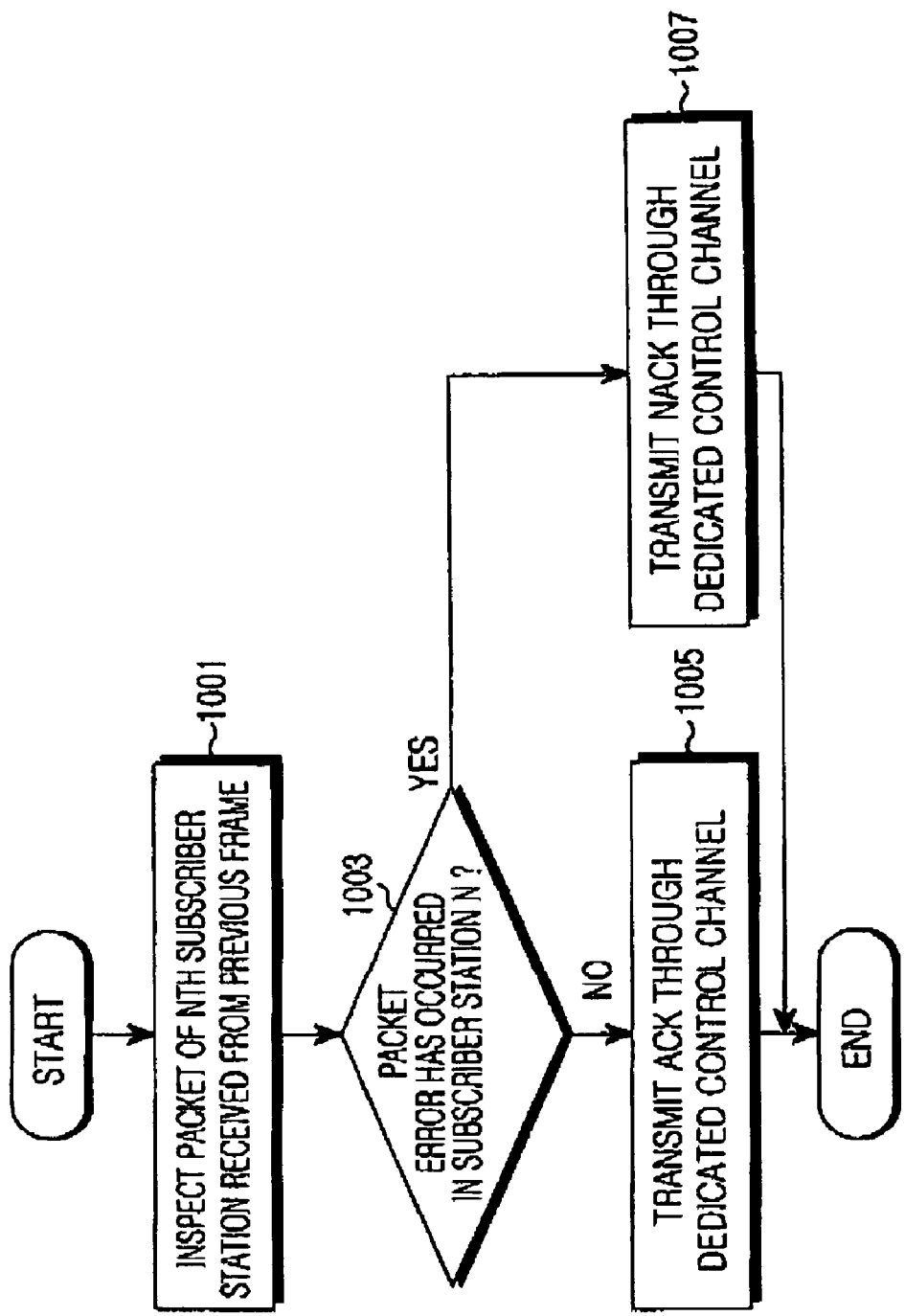
FIG. 10 is a flow diagram illustrating a performance method in a base station for an adaptive open-loop power control according to the second embodiment of the present invention.

FIG. 10 is a flow diagram illustrating a performance method in the base station for an adaptive open-loop power control according to the second embodiment of the present invention.

Referring to FIG. 10, the base station first inspects the packet of an $n^{th}$ subscriber station received from a previous frame (step 1001). Then, the base station determines if an error has occurred in the received packet for the subscriber station n (step 1003).

As a result of determination, when the error has occurred in the received packet, the base station transmits an NACK signal to the subscriber station n through the dedicated control channel (step 1007). In contrast, when the error has not occurred in the received packet, the base station transmits an ACK signal to the subscriber station n through the dedicated control channel (step 1005).

According to the present invention, in a mobile communication system using a TDD scheme, an open-loop power control method adaptively controlled to a link is utilized according to each subscriber station, so that a stable link performance can be maintained with a minimum power requirement for each subscriber station. Further, according to the present invention, the consumption power of a subscriber station is reduced, so that the lifetime of a battery of the subscriber station can be extended. Furthermore, according to the present invention, interference from another subscriber station is reduced, so that the system capacity can be increased.

Although a preferred embodiment of the present invention has been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. An apparatus for determining transmit power of an uplink frame at a subscriber station in a mobile communication system, the apparatus comprising:
   a receive power measurement unit for measuring receive power of signals received from a base station;
   a transmit power controller for determining the transmit power of the uplink frame from the receive power measured by the receive power measurement unit and information related to receptions of an uplink frame, which is received from the base station, wherein the information is based on a dedicated ACK/NACK received from the base station; and
   a transmission radio frequency processor for performing radio processing so that the uplink frame is transmitted according to the transmit power determined by the transmit power controller,
   wherein an increase of the transmit power of the uplink frame is determined by,
   $Offset_{perAT}=Offset_{perAT}+UP\_STEP$, if NACK is received,
   where the $Offset_{perAT}$ represents a compensation value according to the subscriber station, and the UP_STEP represents an increase of the $Offset_{perAT}$.

2. The apparatus in claim 1, wherein the transmit power controller determines the transmit power of the uplink frame further considering a target signal strength received from the base station.

3. The apparatus in claim 1, wherein the transmit power controller determines the transmit power of the uplink frame considering path loss of a wireless channel formed between the base station and the subscriber station.

4. The apparatus in claim 3, wherein the path loss of the wireless channel is determined by the difference between transmit power of the base station and receive power of the subscriber station for a pilot or broadcast channel.

5. The apparatus in claim 1, wherein the transmit power controller determines the transmit power of the uplink frame further considering reception interference and noise level of the base station.

6. The apparatus in claim 5, wherein the reception interference is measured by the base station in a unit of a frame.

7. The apparatus in claim 5, wherein the reception interference is measured by the base station in a unit of a time slot.

8. The apparatus in claim 1, wherein the subscriber station increases the transmit power of the uplink frame when it is determined that the uplink frame has errors based on the information related to receptions of the uplink frame.

9. The apparatus in claim 1, wherein a decrease of the transmit power of the uplink frame is determined by,
   $Offset_{perAT}=Offset_{perAT}-DOWN\_STEP$, if ACK is received,
   wherein the DOWN_STEP represents a decrease of the $Offset_{perAT}$.

10. The apparatus in claim 9, wherein the subscriber station decreases the transmit power of the uplink frame when it is determined that the uplink frame has no errors based on the information related to receptions of the uplink frame.

11. The apparatus in claim 9, wherein the DOWN_STEP is determined by:

$$DOWN\_STEP = \frac{1}{1/FER_{target}-1}UP\_STEP,$$

wherein the UP_STEP represents an increase of the $Offset_{perAT}$, and the $FER_{target}$ is a target value of a Frame Error Rate (FER).

12. A method for determining transmit power of an uplink frame at a subscriber station in a mobile communication system, the method comprising the steps of:
   measuring receive power of signals received from a base station; and
   determining the transmit power of the uplink frame based on the measured receive power and information related to receptions of an uplink frame, which is received by the base station,
   wherein the information is based on a dedicated ACK/NACK received from the base station,
   wherein an increase of the transmit power of the uplink frame is determined by,
   $Offset_{perAT}=Offset_{perAT}+UP\_STEP$, if NACK is received,
   where the $Offset_{perAT}$ represents a compensation value according to the subscriber station, and the UP_STEP represents an increase of the $Offset_{perAT}$.

13. The method in claim 12, wherein the transmit power of the uplink frame is determined further considering a target signal strength received from the base station.

14. The method in claim 12, wherein the transmit power of the uplink frame is determined further considering path loss of a wireless channel formed between the base station and the subscriber station.

15. The method in claim 14, wherein the path loss of the wireless channel is determined by the difference between transmit power of the base station and receive power of the subscriber station for a pilot or broadcast channel.

16. The method in claim 12, wherein the transmit power of the uplink frame is determined based on reception interference and noise level of the base station.

17. The method in claim 16, wherein the reception interference measured by the base station is measured in a unit of a frame.

18. The method in claim 16, wherein the reception interference measured by the base station is measured in a unit of a time slot.

19. The method in claim 12, wherein the transmit power of the uplink frame at the subscriber station is increased, when it is determined that the uplink frame has errors based on the information related to receptions of the uplink frame.

20. The method in claim 12, wherein a decrease of the transmit power of the uplink frame is determined by,
   $Offset_{perAT}=Offset_{perAT}-DOWN\_STEP$, if ACK is received,
   wherein the DOWN_STEP represents a decrease of the $Offset_{perAT}$.

21. The method in claim 20, wherein the transmit power of the uplink frame at the subscriber station is decreased, when it is determined that the uplink frame has no errors based on the information related to receptions of the uplink frame.

22. The method in claim 20, wherein the DOWN_STEP is determined by:

$$DOWN\_STEP = \frac{1}{1/FER_{target} - 1} UP\_STEP,$$

wherein the UP_STEP represents an increase of the Offset$_{perAT}$, and the FER$_{target}$ is a target value of a Frame Error Rate (FER).

23. A method for determining transmit power of an uplink burst at a subscriber station in a mobile communication system, the method comprising the steps of:
   measuring receive power of signals transmitted from a base station; and
   determining the transmit power of the uplink burst based on the measured receive power and a compensation value (Offset$_{perAT}$) that is updated by the subscriber station based on information related to receptions of an uplink burst, wherein the information is based on a dedicated ACK/NACK received from the base station,
   wherein an increase of the transmit power is determined by,
   Offset$_{perAT}$=Offset$_{perAT}$+UP_STEP, if NACK is received and
   where the Offset$_{perAT}$ represents the compensation value to be added to a previous transmit power for each subscriber station, and the UP_STEP represents an increase of the Offset$_{perAT}$.

24. The method in claim 23, wherein the compensation value (Offset$_{perAT}$) is set within a range between the permissible maximum value and minimum value.

25. The method in claim 23, wherein a decrease of the transmit power is determined by,
   Offset$_{perAT}$=Offset$_{perAT}$−DOWN_STEP, if ACK is received, and
   where the DOWN_STEP represents a decrease of the Offset$_{perAT}$.

26. The method in claim 25, wherein the DOWN_STEP is determined by:

$$DOWN\_STEP = \frac{1}{1/FER_{target} - 1} UP\_STEP,$$

wherein the FER$_{target}$ represents a target value of a Frame Error Rate (FER).

27. An apparatus for determining transmit power of an uplink burst at a subscriber station in a mobile communication system, the apparatus comprising:
   a receive power measurement unit for measuring receive power of signals received from a base station;
   a transmit power controller for determining the transmit power of the uplink burst based on the receive power measured by the receive power measurement unit and a compensation value (Offset$_{perAT}$) that is updated by the subscriber station based on information related to receptions of an uplink burst, wherein the information is based on a dedicated ACK/NACK received from the base station,
   wherein an increase of the transmit power is determined by,
   Offset$_{perAT}$=Offset$_{perAT}$+UP$_{13}$ STEP, if NACK is received and
   where the Offset$_{perAT}$ represents the compensation value to be added to a previous transmit power for each subscriber station, and the UP_STEP represents an increase of the Offset$_{perAT}$.

28. The apparatus in claim 27, wherein the compensation value (Offset$_{perAT}$) is set within a range between the permissible maximum value and minimum value.

29. The apparatus in claim 27, wherein a decrease of the transmit power is determined by,
   Offset$_{perAT}$=Offset$_{perAT}$−DOWN_STEP, if ACK is received, and
   where the DOWN_STEP represents a decrease of the Offset$_{perAT}$.

30. The apparatus in claim 29, wherein the DOWN_STEP is determined by:

$$DOWN\_STEP = \frac{1}{1/FER_{target} - 1} UP\_STEP,$$

wherein the FER$_{target}$ represents a target value of a Frame Error Rate (FER).

* * * * *